United States Patent [19]

Fukke

[11] Patent Number: 4,873,129
[45] Date of Patent: Oct. 10, 1989

[54] MAGNETIC RECORDING MEDIUM

[75] Inventor: Hajime Fukke, Tama, Japan

[73] Assignee: Hitachi, Ltd., Tokyo, Japan

[21] Appl. No.: 156,457

[22] Filed: Feb. 16, 1988

[30] Foreign Application Priority Data

Feb. 18, 1987 [JP] Japan .................. 62-33248

[51] Int. Cl.$^4$ ................................. G11B 5/70
[52] U.S. Cl. .................. 428/694; 427/43.1; 427/128; 427/131; 427/132; 428/900
[58] Field of Search ............ 428/694, 695, 328, 329, 428/900; 427/128, 131, 43.1, 54.1, 132, 286

[56] References Cited

U.S. PATENT DOCUMENTS

| 4,410,590 | 10/1983 | Kawahara | 428/457 |
| 4,439,795 | 3/1984 | Kitamoto | 428/900 |
| 4,439,796 | 3/1984 | Kitamoto | 428/900 |
| 4,506,000 | 3/1985 | Kubota | 428/900 |
| 4,511,629 | 4/1985 | Konno | 428/522 |
| 4,624,883 | 11/1986 | Yamaguchi | 428/328 |
| 4,624,894 | 11/1986 | Kishimoto | 428/425.9 |
| 4,741,953 | 5/1988 | Katsuta | 428/694 |
| 4,746,580 | 5/1988 | Bishop | 428/694 |

FOREIGN PATENT DOCUMENTS 52-71211 6/1977 Japan .
2042370 9/1980 United Kingdom .

Primary Examiner—Paul J. Thibodeau
Attorney, Agent, or Firm—Antonelli, Terry & Wands

[57] ABSTRACT

A coating magnetic recording medium which comprises two or more kinds of magnetic films different from one another provided on the same side surface of a non-magnetic substrate.

8 Claims, No Drawings

MAGNETIC RECORDING MEDIUM

BACKGROUND OF THE INVENTION

This invention relates to a magnetic recording medium. Particularly, it relates to a magnetic recording medium excellent in electric characteristics and reliability.

As magnetic disks with higher recording density are desired, there have been proposed magnetic disks of various structures. As to coating-type magnetic disks, there are known, as disclosed in Japanese Patent Application Kokai (Laid-open) Nos. 56-169,226 and 57-167,135, ones wherein the surface roughness of a particular track has been made larger than that of the recording track surface. As to sputtering disks, there are known, as disclosed in Japanese Patent Application Kokoku (Post-Exam. Publn.) No. 61-36290, one wherein the inner and the outer periphery of the magnetic disk have been made to have different coercive forces or, as disclosed in Japanese Patent Application Kokoku (Post-Exam. Publn.) No. 58-43818, one wherein the spaces between recording tracks have been made non-magnetic by ion implantation. Although it is possible in a sputtering disk to make the inner and the outer periphery of the disk have different coercive forces, it is not easy in a coating-type magnetic disk wherein the film is formed by spin coating. For a coating-type magnetic disk, the only attempt so far made is to form one kind of magnetic film on one substrate and process it such that a particular track will have a more rough surface than other parts. No consideration has ever been given to applying different, two or more kinds of coatings onto different regions on one substrate and thereby forming films having utterly different functions.

The prior art techniques mentioned above give, as can be seen in the example of coating-type magnetic disks, no consideration to forming films, having utterly different functions, on different regions of one substrate, and thereby obtaining a magnetic disk more excellent in electric characteristics and reliability. Thus, they have a problem in that a marked improvement of magnetic disk characteristics cannot be expected by such techniques.

The drawbacks of the conventional coating type magnetic recording medium such as mentioned above can be summarized as follows:

(i) In the case of a one-shot coating type magnetic recording medium, writing in the outer zone of the disk is usually difficult, compared with that of the inner zone thereof since the film in the outer zone is always made sufficiently thicker so as to meet the high speed of the magnetic head in said zone compared with that in the inner zone.

(ii) For the purpose of protecting the surface of the disk, α-alumina having a particle size being larger than the thickness of the coating film at 20% is used. Since the coating film of the inner zone is thin while that of the outer zone is thick, it would be difficult to choose α-alumina having a suitable particle size as a hard filler in the case of one-shot coating.

(iii) In order to reduce the abrasion coefficient of the surface of the disk, a liquid lubricant is usually used. However, this brings such a problem that the magnetic head adheres to the surface of the disk during a non-operation period in which said head contacts closely onto the surface of the disk if a considerable amount of said lubricant is used in such a zone so as to enable smooth operation. Moreover, such adhesion may result in damage to both the magnetic head and disk.

SUMMARY OF THE INVENTION

An object of this invention is to provide a coating-type magnetic recording medium excellent in electric characteristics and reliability which has magnetic films having different functions coated on respective, different regions on one substrate.

The above-mentioned object can be attained by providing, in a magnetic recording medium having magnetic film comprising ferromagnetic powders dispersed in a polymeric binder on a non-magnetic substrate, on the same side surface of the above-mentioned non-magnetic substrate two or more kinds of different magnetic films for which the property or the content or both of the ferromagnetic powders or fillers or both are different from one another.

Some magnetic recording media contain no filler. Such media are also within the scope of this invention. In such cases, two or more kinds of magnetic films should be provided for which the property or the content or both of the ferromagnetic powders are different from one another.

One example of the process for producing a magnetic disk according to this invention will be described below. The first coating film is formed by so-called photolithography as follows. A coating material is prepared wherein there is used, as part or the whole of the polymeric binder used for the recording medium of magnetic recording disks and the like, a radiation-curable resin which will react by the action of such radiation of specific wavelength ranges as UV and electron beam (hereinafter referred to as EB). The coating material is coated on a non-magnetic substrate by a conventional method, and then only the desired region of the coated film selected as desired depending on intended purposes etc. is irradiated by UV or electron beam, while regions other than that desired are being protected by masking or the like method. The double bonds, functional groups etc. in the radiation-curable resin are instantaneously activated by irradiation, and crosslinking between molecules proceeds immediately. Resultantly, the film of the irradiated region is insolubilized. Thereafter, the part of the film other than the desired region, which has not been subjected to UV or EB irradiation, is washed off. When a magnetic disk comprising two kinds of film is desired, another coating material which contains a radiation-curable resin as a part or the whole of the polymeric binder is coated and then the same procedure as mentioned above is followed to obtain the intended magnetic disk. Magnetic disks comprising three or more kinds of film may be obtained by repeating similar procedure. Plural numbers of film layers can be formed either in concentric circle-like shape or in identically repeated shapes on regularly-specified areas and/or zones, however, they can be varied, depending upon the intended usage or the like.

The radiation-curable resin which can be used in this invention may be those commonly used for magnetic disks so long as they undergo polymerization by the action of UV or EB. Typical examples thereof are epoxy (meth)acrylate, oligoester (meth)acrylate, vinyl esters, polyurethane (meth)acrylates, polyester (meth)acrylates, epoxy resins, amino alkyd resins, unsaturated polyester resins, silicone resin, polyimide and the like. The polymeric binder other than the radiation-curable resin may be any of those commonly used as such for a magnetic recording medium, for example, epoxy resins, phenoxy resins, vinyl-based resins (e.g., vinyl chooride-vinyl acetate copolymer, vinyl chloride-vinyl acetate-alcoholcopolymer, polyvinylbutyrol, polyvinylformal, polyvinyl acetate or the like), cellulosic resins (nitrocellulose or acetylcellulose), phenol resins, and urethan polymers. For preparing the coating material mentioned above, various kinds of organic solvents are used. These solvents may be any of those commonly used for coating material for a magnetic recording medium such as, for example, ketones (cyclohexanone, isophorone, diacetone alcohol, diisobutyl ketone, methyl n-amyl ketone or the like), glycol esters (oxitol acetate, butyl oxitol acetate, oxitol, butyl oxitol, methyl oxitol acetate), and the like.

According to this invention, unlike the prior methods which involve repeated coating of baking-type magnetic coating material, the curing of the film is instantaneously effected by irradiating it with UV or EB in a coating machine or a magnetic field-orienting machine; accordingly there is no need for transferring a coated disk to a baking furnace. This offers an advantage in that there is no danger of dust deposition onto the coated disk.

DETAILED DESCRIPTION OF THE PREFERRED EMBODIMENTS

This invention will be further described in detail below with reference to Examples.

EXAMPLE 1

Two kinds, namely A and B, of magnetic coating materials were prepared as follows. First, 700 parts by weight of $\gamma$-$Fe_2O_3$ powders with a coercive force of 350 Oe, 60 parts by weight of butyral resin, and 40 parts by weight of monocrystalline alumina having a particle diameter of 0.5 $\mu$m were charged into a kneader and mixed for about 15 minutes. Then, 800 parts by weight of cellosolve acetate was gradually added thereto, and the whole was kneaded for 8 hours. Then, 690 parts by weight of the kneaded product obtained above was placed in a ball mill pot, 350 parts by weight of cellosolve acetate was added thereto, and the whole was milled in the ball mill for 3 days to effect the dispersion of the magnetic powders. Then, a solution of 120 parts by weight of photo-curable epoxy acrylate dissolved in 770 parts by weight of butyl cellosolve was added thereto. Thus, magnetic coating material A was prepared.

Magnetic coating material B was prepared in the same manner as for the magnetic coating material A except that monocyrstalline alumina of particle diameter 0.8 $\mu$m was used in place of the monocrystalline one of particle diameter of 0.5 $\mu$m used in preparing the magnetic coating material A.

The magnetic coating material A mentioned above was spin-coated on an aluminum substrate of 8.8 inches in diameter whose surface had been cleaned beforehand, and subjected to magnetic field orientation by a conventional method (U.S. Pat. No. 4,189,508). Immediately thereafter, the outer peripheral part of the magnetic disk was masked and the disk was irradiated with UV for 10 seconds. Then, the film of the outer peripheral part of the magnetic disk was washed off with an organic solvent. Thereafter, the coating material B was overcoated on the surface of the disk and subjected to magnetic field orientation by a conventional method. Immediately thereafter, the inner peripheral part of the magnetic disk was masked, and the disk was subjected to UV irradiation for 10 seconds. Then, the upper layer part of the coated film of the inner peripheral part of the magnetic disk was washed off with an organic solvent. Thereafter, UV irradiation was again conducted thoroughly to effect complete cure of the film. Finally, surface processing and application of a lubricant were carried out. Thus, a magnetic disk was prepared in which the alumina powder diameter in the film differed at the inner peripheral part from that at the outer peripheral part. The film thickness and the surface roughness of the magnetic disk were 0.4 $\mu$m and 0.010 $\mu$mRa at R=65 mm, and 0.6 $\mu$m and 0.011 $\mu$mRa at R=105 mm. As compared with a magnetic disk in which the whole surface had been coated with the magnetic coating material A alone, the magnetic disk obtained above had about twice as large abrasion resistance of the film of the outer peripheral part of the disk, though the disks were nearly equal in electric characteristics.

EXAMPLE 2

A magnetic coating material C was prepared in the same manner as that for the magnetic coating Material A except that $\gamma$-$Fe_2O_3$ powder having a coercive force of 400 Oe was used in place of the $\gamma$-$Fe_2O_3$ powder having a coercive force of 350 Oe used in the preparation of the magnetic coating material A.

The magnetic coating material C mentioned above was spin-coated on an aluminum substrate of 8.8 inches in diameter whose surface had been cleaned beforehand, and subjected to magnetic field orientation by a conventional method. Immediately thereafter, the outer peripheral part of the magnetic disk was masked and the disk was irradiated with UV for 10 seconds. Then, the film of the outer peripheral part of the magnetic disk was washed off with an organic solvent. Thereafter, the coating material A described in Example 1 was overcoated on the surface of the disk and subjected to magnetic field orientation. Immediately thereafter, the inner peripheral part of the magnetic disk was masked, and the disk was subjected to UV irradiation for 10 seconds. Then, the upper layer part of the coated film of the inner peripheral part of the magnetic disk was washed off with an organic solvent. Thereafter, UV irradiation was again conducted thoroughly to effect complete cure of the film. Finally, surface processing and application of a lubricant were carried out. Thus, a magnetic disk was prepared in which the coercive force at the inner peripheral part differed from that at the outer peripheral part. The film thickness and the surface roughness of the magnetic disk were 0.4 $\mu$m and 0.010 $\mu$mRa at R=65 mm, and 0.6 $\mu$m and 0.010 $\mu$mRa at R=105 mm. As compared with a magnetic disk of the same film thickness in which the whole surface had been coated with the magnetic coating material C alone, the magnetic disk obtained above had an Over/Write characteristic of the outer peripheral part of the disk improved by 3 dB, though the disks were nearly equal in abrasion resistance of the film.

According to this invention, a magnetic recording medium which comprises two kinds or more of films having different functions formed on the different regions of one substrate can be prepared very easily, rapidly and without deposition of dust onto the disk by, for example, curing only the particular region of the film coated on one substrate and then removing the parts other than the desired region. Accordingly, this invention is effective in obtaining a magnetic disk excellent in electric characteristics and reliability.

What is claimed is:

1. A coating magnetic recording medium which comprises a non-magnetic substrate and at least two magnetic films different from one another formed on said substrate, each of said films comprising a ferromagnetic powder dispersed in a polymeric binder and being provided on the same side surface of the non-magnetic substrate in different regions; each of said magnetic films being formed separately by a process comprising coating on the non-magnetic substrate a coating material which contains a radiation-curable resin in the polymeric binder, then, by means of photolithography, leaving only a desired part behind and removing another part with an organic solvent and, thereafter, curing the desired part on the non-magnetic substrate.

2. A coating magnetic recording medium according to claim 1 wherein the magnetic films different from one another are different in at least one of the kind and the content of the ferromagnetic powder.

3. A coating magnetic recording medium according to claim 1 wherein two magnetic films different from one another are formed on the substrate.

4. A coating magnetic recording medium according to claim 1, wherein the magnetic films are different form one another and are different in at least one among the properties and the content of magnetic powder, and the properties and the content of filler.

5. A casting magnetic recording medium which comprises a non-magnetic substrate, and at least two magnetic films different from one another formed on said substrate, each of said films comprising a ferromagnetic powder and a filler dispersed in a polymeric binder and being provided on the same side surface of the non-magnetic substrate in different regions; the filler contained in each of said films being different from one another.

6. A coating magnetic recording medium according to claim 5, wherein each of said at least two magnetic films is separately formed by a process comprising coating on the non-magnetic substrate a coating material which contains a radiation-curable resin in the polymeric binder, then, by means of photolithography, leaving only a desired region of the coating material behind and removing another region of the coating material with an organic solvent and the curing the desired region.

7. A coating magnetic recording medium according to claim 5, wherein the ferromagnetic powder contained in each of said films is different from one another.

8. A coating magnetic recording medium according to claim 5, wherein said magnetic powder and said filler of each of said films are different in at least one among the properties and contents from one another.

* * * * *